Feb. 22, 1927.  1,618,341
H. W. HOWLAND
MACHINE FOR SAWING AND BORING ON A PLURALITY OF ANGLES
Filed Jan. 5, 1926   3 Sheets-Sheet 1
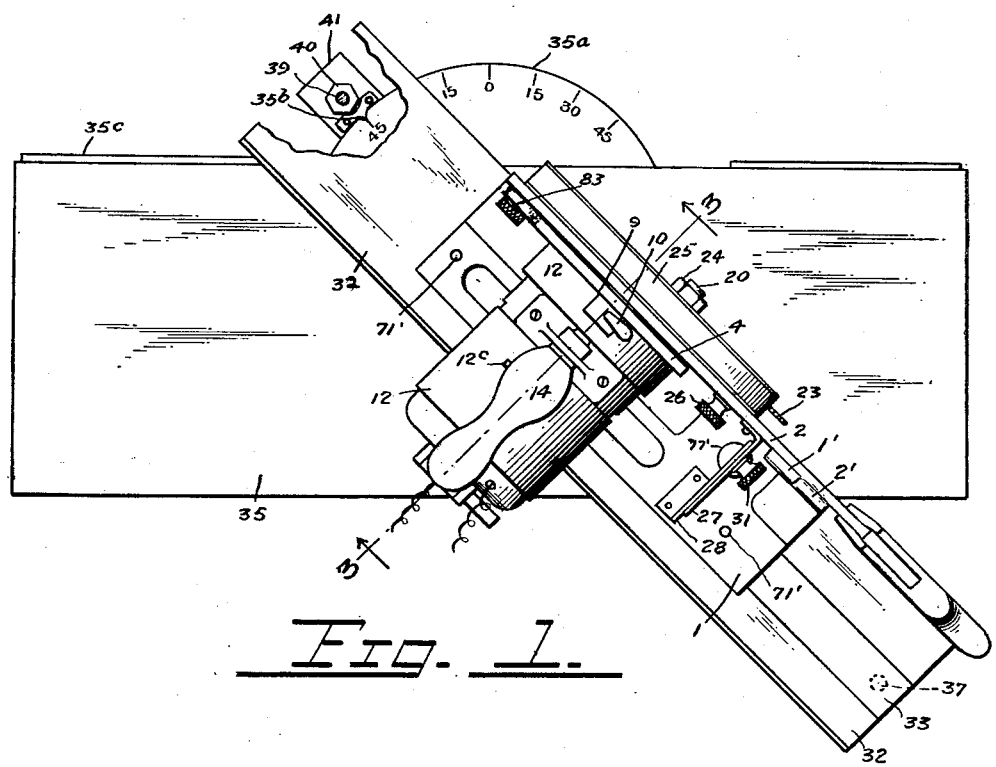
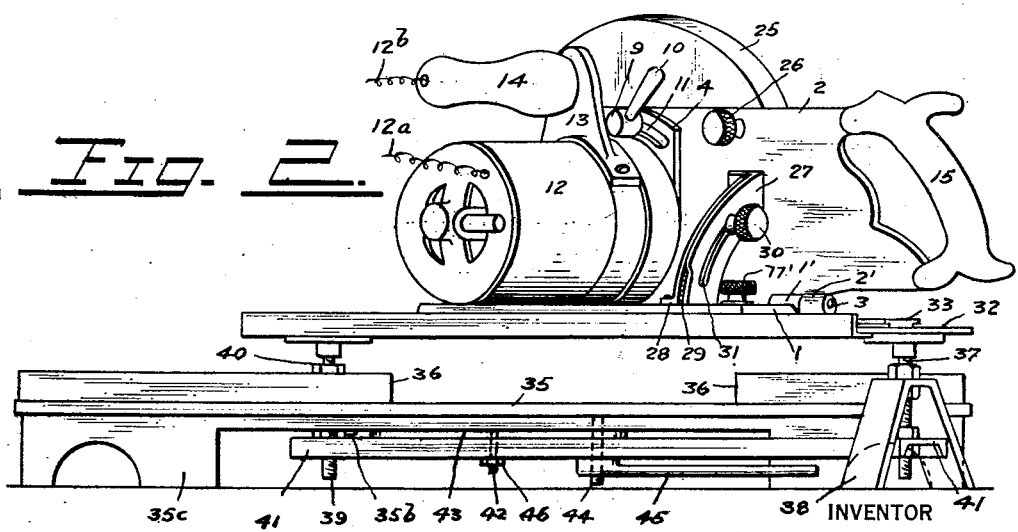
INVENTOR
H. W. Howland
BY
Mason Fenwick & Lawrence,
ATTORNEY Feb. 22, 1927.

H. W. HOWLAND 1,618,341

MACHINE FOR SAWING AND BORING ON A PLURALITY OF ANGLES

Filed Jan. 5, 1926     3 Sheets-Sheet 2

INVENTOR
H. W. Howland
BY
Mason Fenwick & Lawrence
ATTORNEY

Feb. 22, 1927.

H. W. HOWLAND 1,618,341

MACHINE FOR SAWING AND BORING ON A PLURALITY OF ANGLES

Filed Jan. 5, 1926   3 Sheets-Sheet 3

INVENTOR
*H. W. Howland*
BY
*Mason Fenwick & Lawrence*
ATTORNEY

Patented Feb. 22, 1927.

1,618,341

UNITED STATES PATENT OFFICE.

HARRY W. HOWLAND, OF SEATTLE, WASHINGTON, ASSIGNOR TO ELECTRIC HAND SAW COMPANY, OF SEATTLE, WASHINGTON, A CORPORATION.

MACHINE FOR SAWING AND BORING ON A PLURALITY OF ANGLES.

Application filed January 5, 1926. Serial No. 79,485.

This invention relates to a combination machine for operating circular and reciprocating saws, and boring instruments at various predetermined lines and angles.

The objects of the invention are to provide a portable machine to be operated by any simple motor, connected to a tool plate and tool shaft, with a base plate connected with the tool plate by hinges to permit various adjustments and positions between the tool plate and base plate, with a groove in the bottom of the base plate and a guide frame and rib to fit the groove on the frame, and the frame adjustably mounted over a table to hold the material to be sawed, so that by adjusting the positions of the tool plate and the guide frame, that a great number of different angles may be cut in and on the material for mitre joints, and as may be otherwise desired.

A further object is to provide a portable machine with a motor and a power shaft therefrom, to which various forms of cutting and boring tools may be attached, with a base plate for supporting the machine directly upon, or above the objects to be cut or bored, and with gages for directing and controlling the line of travel of the machine when operated over or against the objects to be cut or bored.

A further object is to provide a portable machine with a motor driven circular saw, the saw mounted on a shaft which may be raised and lowered to adjust the distance the saw shall cut beneath the machine, with a base plate for supporting the machine on or above the object to be sawed, and means for adjusting the saw so that the blade will cut at various angles to the base plate.

Still further objects are shown in the specification following; and I have illustrated my invention by the accompanying drawings, of which:

Figure 1 is a top plan of the apparatus with a circular saw attached;

Figure 2 is a rear elevation perspective view;

Figure 3:
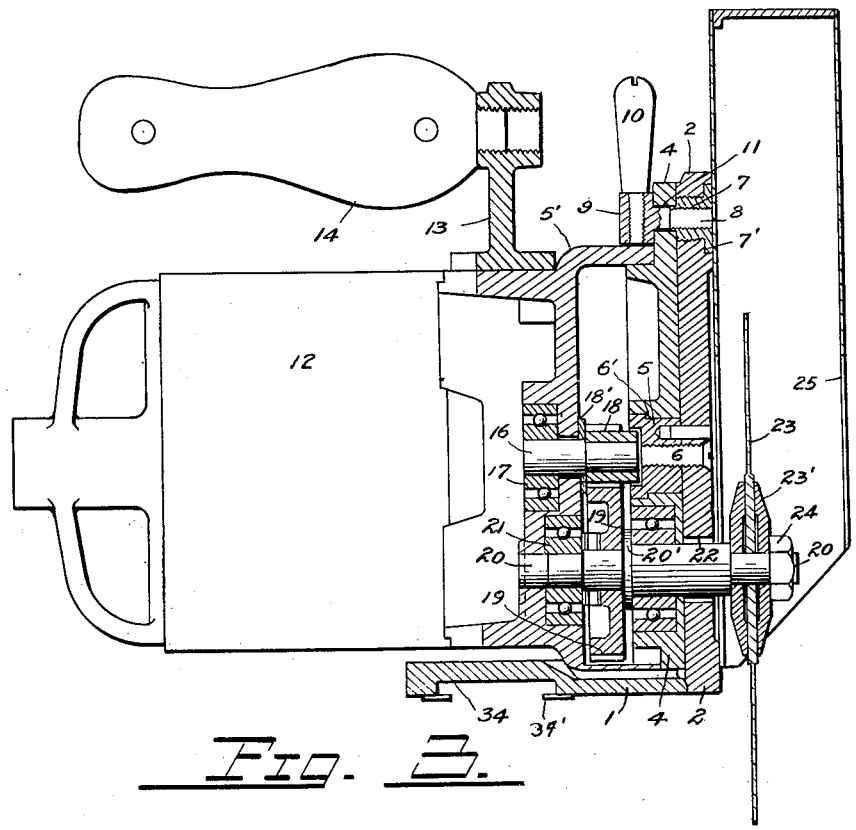
Figure 3 is an end elevation, partly in section, taken on line 3—3 Fig. 1.

Like numerals on the different figures represent like parts. 1 is the horizontal foot plate, attached to the tool plate by hinges at each end formed by ears 2' a part of 2, and 1' as part of 1, and pin 3 therethrough; 4 is the front or face plate to which the motor frame 5' is suitably affixed, the plate 4 is rotatably held in position by a pivot block 5, and a screw 6 binding the part 5 to plate 2 with suitable tension to permit the plates to slide. A shoulder 6' extends over a part of the plate 4, and a threaded bushing 7, with flange 7' is provided near the top of 2, and a binding screw 8 with a head 9 and lever 10 are used for binding the plates 2 and 4 together at points desired for operating tools, a slot 11 in top of 4 permits it to be moved as desired when the head 9 is slacked. 12 is any form of motor casing containing any desired form of portable motor, preferably operated by electricity over wires 12$^a$ and 12$^b$ and switch 12$^c$. A handle lug 13 and handle 14 and another handle 15 on the plate 2 permits the operator to readily apply the mechanism where required.

A motor shaft 16 with ball bearings 17 protrudes from the motor out through the frame 5' with a driving pinion 18, and holding flange 18' which pinion drives a connecting gear 19 affixed on a shaft or arbor 20, also provided with ball bearings 21 and a holding flange 20', a slot 22 on a curved line in the tool plate 2 permits the shaft 20 to be raised and lowered as may be desired for raising and lowering the position of the lower or cutting teeth of the circular saw 23 while attached to the end of the arbor. A jamb nut 24 binds the saw, between washer plates 23', and a safety guard 25, may be held over the saw by screw 26. The saw may be caused to cut a bevelled or mitre edge on the timber by changing the angle of the plate 2 with base 1, and this is permitted by the adjusting arms 27 attached to 2, and 28 attached to 1, with a scale 29 suitably marked on 28 to enable the operator to determine with exactness the angle the saw shall operate, and the position is then fixed by the binding screw 30 slidably mounted through slot 31 and threaded into arm 28.

The circular saw is preferably operated over a mitre-gage frame 32 with adjustable means for determining the angle the saw shall travel along or across the wood to be sawed on a guide rib 33 affixed to the frame 32, the rib fitting into a corresponding groove 34, in the bottom of the base 1, over plates 34'.

The frame 32 is adjustably supported over a work table 35 upon which the material to be sawed is laid and held laterally by side bars 36. The support at one end being an adjustable threaded rod 37 with independent legs 38, and the other end, by an adjusting rod 39 and nut 40, and the lower end threaded through connecting bar 41, which latter is upheld by a pivot bolt 42 and nut 46 to and beneath the lower frame 35ᵃ of the table 35, with a spacer plate 43 between the bar 41 and the said frame. A lock stud bolt 44 extends down from frame 35ᵃ, and a locking lever 45 with end threaded over bolt 44 permits the operator to bind gage frame 32 into any determined position or angle across the table 35. A dial plate 35ᵃ is affixed to one side of the table, and a pointer 35ᵇ extends up from the bar 41 and protrudes over the edge of the plate and indicates by the dial numerals at what point or position the frame 32 shall be held, to provide the desired mitre or bevel cut to be made on the material to be sawed. The plate 41 is widened and provided with a slot where the pivot 42 extends therethrough. Thus by shifting the angle to the base 1 and tool plate 2, and by again shifting the position of the frame 32 above the table 35, and by further shifting the elevation of the saw by raising or lowering the arbor 20 in the slot 22, a great number of different angles may be cut by the same saw, and through different thicknesses of material according to depression of the saw beneath the base 1 and the lines or mitres to be cut are absolutely predetermined by the adjusting means and tables.

Figure 4:
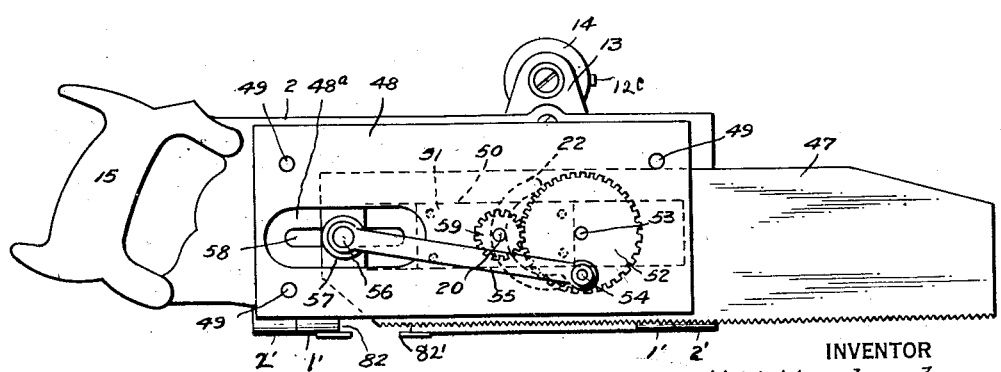
Figure 4 is a front elevation of the tool plate with a reciprocating saw.

In Figure 4, is shown the combination of the motor and tool plate with a reciprocating saw 47 for use in corners and positions where the circular saw cannot be operated, this saw is slidably mounted between two parallel plates 48 and 48ᵃ and held in position a suitable space from the tool plate 2 by bolts 49. The saw blade is cut out to form a slot 50 which fits slidably over a guide block 51 affixed to the plate 48, and a suitable gear wheel 52 is rotatably mounted on a short shaft 53 affixed to plate 48. The gear carries a crank pin 54 over which is placed one end of a connecting rod 55, the other end mounted on a wrist pin 56 which passes through a hole in the saw and through plate 48ᵃ with a head on the back thereof and a washer 57 on the front on the saw. A slot 58 through plate 48ᵃ permits the pin to move as the crank forces the saw back and forth, the block 51 and the pin 56 holding the saw on a straight line. The gear is driven by a pinion 59 which is threaded on the end of the arbor 20 in place of the holding nut 24. The saw may be operated in perpendicular position or on an angle by shifting plate 2 with 1.

Figure 5:
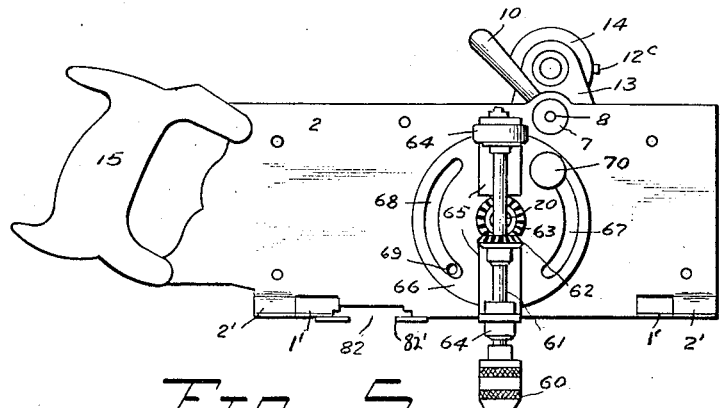
Figure 5 is front elevation of the tool plate with a boring attachment.
Figure 6:
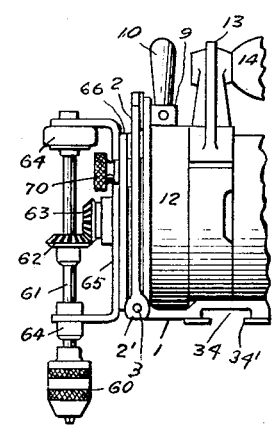
Figure 6 is an end elevation of part shown in Fig. 5, and part of motor.

Figures 5 and 6 illustrate the combination of the tool plate and motor mechanism and a boring mechanism, with a drill chuck 60 on a suitable shaft 61 carrying a bevelled gear 62 driven by a corresponding gear 63 threaded on the end of arbor 20, and a shaft 61 with journals 64 held by brackets 65 on adjusting plate 66, the latter provided with oppositely positioned curved slots 67 and 68 for a guide lug 69 and a binding screw 70 to slide within for holding the plate 66 in any desired position for boring holes with any form of drill or bit in the chuck. The plate 66 is adjusted upon the arbor 20 and held in position by base of the gear 63 and the screw 70.

It will be readily understood that the boring instruments may be operated at any angle to which the shaft 61 is adjusted on plate 2, and that the plate 2 may be also moved and held in various angles with the base 1, in order to further provide for boring at angles laterally. The base 1 may be operated in combination with the frame and guide 32 and 33.

Figure 7:
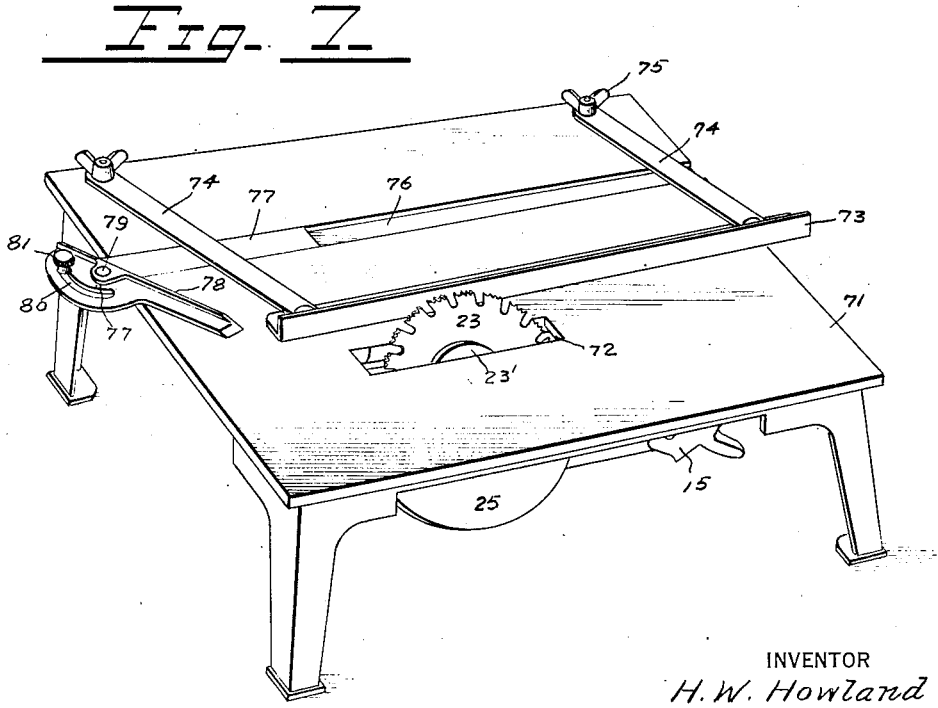
Figure 7 is a perspective view of a saw bench with the circular saw protruding up through the top on an angle.

For operation of the circular saw in connection with any saw bench or table 71 shown in Fig. 7, the base plate 1 is fastened to the bottom of the bench by suitable bolts through holes 71ᵃ in the base, and the saw blade 23, projected up through a slot 72 in the bench. By adjusting the angles of the tool plate 2 with base 1 under 71, the operator may be able to saw his material at various angles, while the same is held by the ordinary guide bar 73 and adjusting arms 74 and binding nuts 75. A gage groove 76 is provided in the bench top, in which a gage stem 77 is slidably operated with an adjustable head piece 78, held by pivot 79 to 77, with registering slots 80 through the arm and head for a binding screw 81, by which the head may be held at any desired angle with the saw blade, thus enabling the operator to use the saw for cross cutting, as well as lengthwise of the material and at a series of angles for mitre joints and connections.

The arm and headpiece 76 and 77 are readily removable from the groove 76, and a suitable groove 82 with holding plates 82' is provided across the bottom of the base plate 1 into which the arm 77 may be inserted bottom side up and held by screw 77' and the head piece 78 used in such combination as a gage for the operator to use alongside of a piece of timber while the circular saw is being used separately from the parts 32 and 35.

While operating with the reciprocating saw it is necessary that the plate 2 be held in rigid relation with the plate 4, and a suitable lock screw 83, is provided to so hold the same, in proper predetermined alignment.

Having described my invention, I claim as new:

In combination a portable motor and circular saw, with a tool plate adjustably connected with the motor, a tool arbor adjustably positioned through the tool plate and driven by the shaft of the motor, the shaft and arbor on the same plane but spaced apart laterally from each other, and connected by gears to permit the arbor to be driven at different positions through the tool plate with a circular saw mounted on the outer end of the arbor to cut material at various depths below the motor as the arbor is raised or lowered, with a base plate hinged to the lower edge of the tool plate and means for holding the plate and base at predetermined angles with each other for sawing material at various angles with the base plate.

In testimony whereof I affix my signature.

HARRY W. HOWLAND.